March 1, 1938.   J. H. DE BOER ET AL   2,109,879
ASYMMETRIC ELECTRODE SYSTEM
Filed Dec. 30, 1936
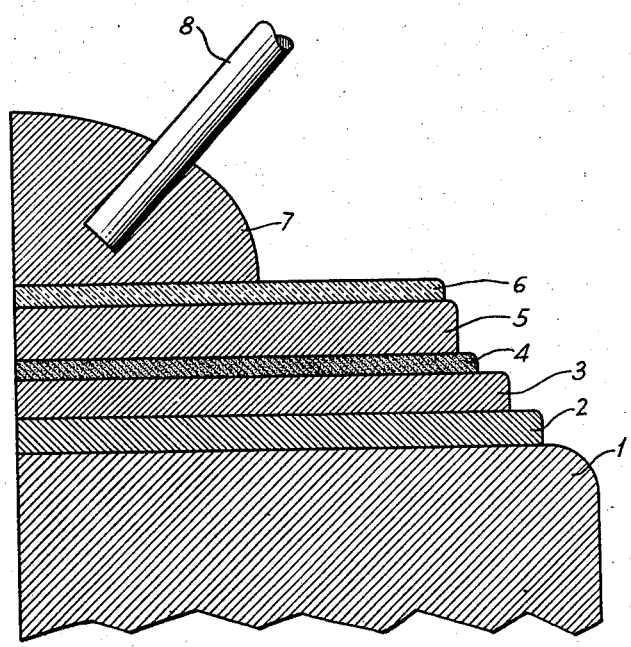
INVENTORS
JAN HENDRIK DE BOER AND
WILLEM CHRISTIAAN VAN GEEL
BY
Charles McClair
ATTORNEY Patented Mar. 1, 1938

2,109,879

UNITED STATES PATENT OFFICE 2,109,879

ASYMMETRIC ELECTRODE SYSTEM

Jan Hendrik de Beer and Willem Christiaan van Geel, Eindhoven, Netherlands, assignors to N. V. Philips' Gloeilampenfabrieken Application December 29, 1936, Serial No. 118,296
In Germany December 19, 1935

6 Claims. (Cl. 175—366)

This invention relates to an electrode system with unsymmetrical conductivity in which the semi-conductive electrode consists for the greater part of selenium which is applied on to a carbon carrier.

When the selenium is provided on carbon, for instance in the form of graphite, a low transition resistance is obtained, since the selenium adheres firmly to carbon. Furthermore it has been found that carbon on the other hand perfectly adheres to various metals, even after selenium has been applied in the liquid state. Such metals are, for instance, brass, iron or aluminum. The provision of an extremely thin carbon or graphite layer on a metal from a colloidal solution allows firm adherence of the selenium, the carbon itself firmly adhering to the metal layer.

In addition the intermediate layer of carbon has the advantage that a chemical compound from these substances is not, or at least less easily, formed between the selenium layer and the metal or carbon support. Such a compound might constitute an insulating coating which would affect the rectifying effect of the system, since an insulating coating together with an adjoining high conductivity electrode is already available on the other side of the selenium. Thus the system would comprise two rectifiers whose effects would partly neutralize each other.

In practice it is found that such an undesirable insulating coating may arise also on the surface of the metal support on to which the intermediate carbon layer is applied. Such a layer might be formed in the air or by the action of selenium vapors in the manufacture of the electrode system.

The present invention provides a construction by which the formation of such a troublesome layer is avoided.

According to the invention this is ensured by furnishing the metal support with an anti-corrosion coating. This measure permits the support for the carbon layer to be made from metals having the most favorable properties as regards electrical and thermal conductivity, since the condition of freedom of corrosion need no longer be satisfied when this material is used. Preferably copper is used for this purpose.

In high tension rectifying tubes having a low current strength to be rectified it is advantageous to make the selenium support from aluminum, since a high tension rectifier consists of a large number of series-connected elements each of which comprises a selenium support. When these supports are made from aluminum a considerable saving in weight is achieved.

The metal supports are protected against corrosion, which is preferably effected by coating the supports with nickel or chromium. As is well known, chromium is a metal which as a rule does not easily form a compound with other materials. In addition it has the favorable property that the carbon layer can be applied thereto in a sufficiently rigid manner. This may still be improved by roughening the support, for instance by means of sand blasting.

Nickel itself is more readily attacked than chromium by selenium vapors, it is true, but it has been found in practice, that when a nickel layer is provided on copper or aluminum even constrained action of selenium vapors does not produce a transition resistance and that, if these metals were not protected by means of a nickel layer, this drawback would seriously manifest itself.

The protective properties of nickel against atmospheric affection per se are well known. The reason that nickel is to be preferred over chromium is that the carbon layer adheres much more firmly thereto.

The invention will be more clearly understood by reference to the accompanying drawing representing by way of example on a greatly enlarged scale one form of construction of an electrode system according to the invention.

The metal support 1 of aluminum is coated with a nickel layer 2 which is applied for better adherence of the chromium layer 3. The two layers 2 and 3 are applied by electrolysis.

On to the chromium layer is applied a carbon layer 4 which serves for the adherence of the selenium which is applied in the liquid state in the form of a layer 5 having a thickness of about 0.1 mm. The selenium has provided on it an insulating coating 6 of polystyrene which may be provided from a solution in benzene. The counter-electrode 7 consists of Wood's metal which is applied on to the insulating coating in the form of a molten drop in which the supply conductor 8 is inserted.

Also other forms of construction fall within the scope of the invention. Instead of chromium it is possible to use more particularly also other anti-corrosion coatings such as gold or platinum for the metal support of the carbon layer. Gold or platinum could also be substituted for the nickel instead of for the chromium.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

What we claim as new is:

1. An electrode system having unsymmetrical conductivity and comprising a metal support, a selenium layer on said metal support and an intermediate anti-corrosive coating and a carbon coating between said metal support and said selenium layer.

2. An electrode system having unsymmetrical conductivity and comprising a copper support and a selenium layer, and an intermediate anti-corrosive coating and a carbon coating between said selenium layer and said copper support.

3. An electrode system having unsymmetrical conductivity and comprising an aluminum base, an anti-corrosive coating on said aluminum base, a layer of carbon on said anti-corrosive coating and a selenium layer on said carbon coating.

4. An electrode system having unsymmetrical conductivity and comprising an aluminum base, successive layers of nickel, carbon and selenium on said base.

5. An electrode system having unsymmetrical conductivity and comprising an aluminum base and successive layers of nickel, chromium, carbon and selenium.

6. An electrode system having unsymmetrical conductivity and comprising an aluminum base and successive layers of nickel, chromium, carbon and selenium, and an insulating coating on said selenium.

JAN HENDRIK DE BOER.
WILLEM CHRISTIAAN VAN GEEL.